US012590205B2

(12) United States Patent
Perera et al.

(10) Patent No.: US 12,590,205 B2
(45) Date of Patent: Mar. 31, 2026

(54) HIGHLY SOLUBLE PEA STARCH AS REPLACER OF MALTODEXTRIN

(71) Applicant: ROQUETTE FRERES, Lestrem (FR)

(72) Inventors: Chandani Perera, Batavia, IL (US); Liuming Zhou, Geneva, IL (US); Ken Jian, Naperville, IL (US); Jovin Hasjim, Bethune (FR)

(73) Assignee: Roquette Freres, Lestrem (FR)

( * ) Notice: Subject to any disclaimer, the term of this patent is extended or adjusted under 35 U.S.C. 154(b) by 461 days.

(21) Appl. No.: 18/247,654

(22) PCT Filed: Oct. 6, 2021

(86) PCT No.: PCT/EP2021/025395
§ 371 (c)(1),
(2) Date: Apr. 3, 2023

(87) PCT Pub. No.: WO2022/073646
PCT Pub. Date: Apr. 14, 2022

(65) Prior Publication Data
US 2024/0110045 A1 Apr. 4, 2024

Related U.S. Application Data

(60) Provisional application No. 63/193,354, filed on May 26, 2021, provisional application No. 63/151,884, (Continued)

(51) Int. Cl.
*C08L 3/00* (2006.01)
*A23L 29/212* (2016.01)
(Continued)

(52) U.S. Cl.
CPC .............. *C08L 3/02* (2013.01); *A23L 29/212* (2016.08); *C08B 30/12* (2013.01)

(58) Field of Classification Search
None
See application file for complete search history.

(56) References Cited

U.S. PATENT DOCUMENTS 4,298,400 A * 11/1981 Armbruster ............... C01C 1/18
127/29
2007/0055058 A1 * 3/2007 Berckmans ............. B01J 19/18
536/107
(Continued)

OTHER PUBLICATIONS

Iida, et al., "Control of viscosity in starch and polysaccharide solutions with ultrasound after gelatinization", Innovative Food Science and Emerging Technologies, Elsevier, Amsterdam, NL, vol. 9, No. 2, Nov. 17, 2007 (Nov. 17, 2007), pp. 140-146, XP022476136,ISSN: 1466-8564, DOI:10.1016/J.IFSET.2007.03. 029; the whole document.

(Continued)

*Primary Examiner* — Stefanie J Cohen

(57) ABSTRACT

The invention is related to a high soluble leguminous starch having a content of oligosaccharides with a Degree of Polymerization (DP) of 1 and 2 of less than 10% in weight, more preferably less than 6%, a content of oligosaccharides with a DP of 3 to 20 of more than 50% in weight, more preferably more than 70%, a water solubility of more than 90% in weight, more preferably more than 95%, a viscosity of less than 500 cP, more preferably of less than 100 cP, and characterized by an $\alpha 1,4/\alpha 1,6$ ratio determined by $^{13}C$ NMR between 25 to 35%, preferably between 28 to 32%.

21 Claims, 3 Drawing Sheets

Mixing tank — Pressure reactor — Homogenizer — Ultrasonic device — Spray dryer

Related U.S. Application Data filed on Feb. 22, 2021, provisional application No. 63/107,510, filed on Oct. 30, 2020, provisional application No. 63/087,959, filed on Oct. 6, 2020.

(51) Int. Cl.
   *C08B 30/12*      (2006.01)
   *C08L 3/02*       (2006.01)

(56)                References Cited

U.S. PATENT DOCUMENTS

2010/0196542  A1*   8/2010   Boursier .................. A23P 10/30
                                                            426/302
2012/0121873  A1*   5/2012   Mann ..................... C09J 103/00
                                                            106/206.1

OTHER PUBLICATIONS

Chung Koo Min, et al., "Physicochemical Properties of Sonicated Mung Bean, Potato, and Rice Starches", Cereal Chemistry, vol. 79, No. 5, Sep. 1, 2002 (Sep. 1, 2002), pp. 631-633, XP55876211, US ISSN: 0009-0352, DOI: 10.1094/CCHEM.2002.79.5.631 the whole document.

Zia-Ud-Din, et al., "Physical and chemical modification of starches: A review", Critical Reviews in Food Science and Nutrition, vol. 57, No. 12, Nov. 3, 2015 (Nov. 3, 2015), pp. 2691-2705, XP055534336, USA ISSN: 1040-8398, DOI: 10.1080/10408398.2015.1087379 p. 2696.

Zhu Fan Ed—Anese Monica, et al., "Impact of ultrasound on structure, physicochemical properties, modifications, and applications of starch", Trends in Food Science and Technology, vol. 43, No. 1, Jan. 1, 2015 (Jan. 1, 2015), pp. 1-17, XP029153880, ISSN: 0924-2244, DOI: 10.1016/J.TIFS.2014.12.008.

Hoover R., et al., "Composition, molecular structure, properties, and modification of pulse starches: A review", Food Research International, Elsevier, Amsterdam, NL, vol. 43, No. 2, Mar. 1, 2010 (Mar. 1, 2010), pp. 399-413, XP026881626, ISSN: 0963-9969, Doi: 10.1016/J.FOODRES.2009.09.001 [retrieved on Sep. 11, 2009] the whole document.

Anonymous: "New taste masking Solutions—Kleptose Linecaps", www.roquettepharma.com, Feb. 7, 2014 (Feb. 7, 2014), pp. 1-4, XP055286145, Retrieved from the Internet: URL: http://web.archive.org/web/20140207194 402/http://www.roquette-pharma.com/media/deliacmsmedia/78/7860-0276d7.pdf [retrieved on Jul. 5, 2016] the whole document.

* cited by examiner

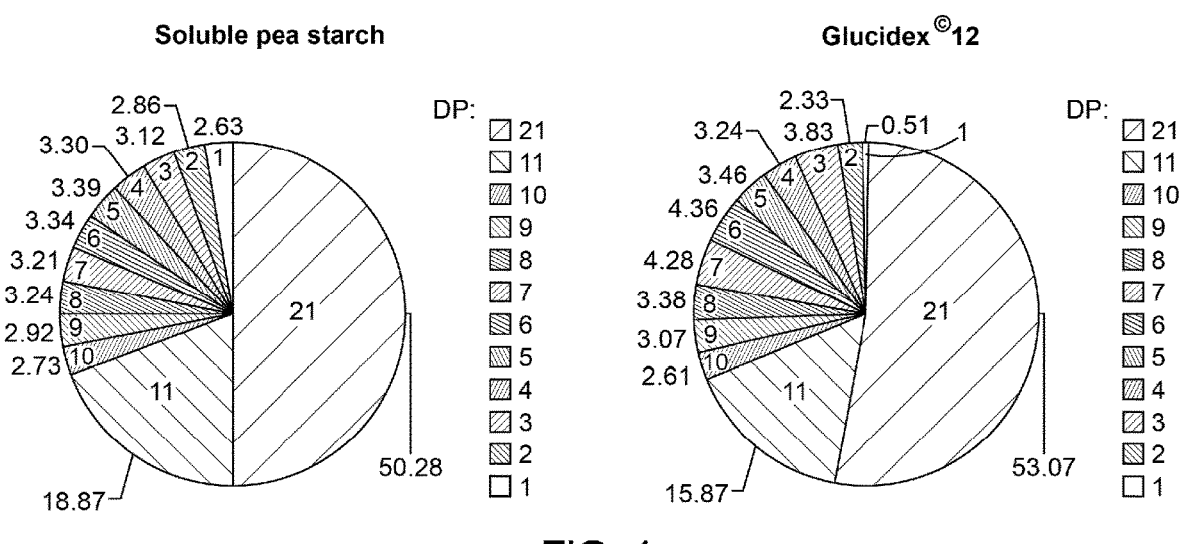
FIG. 1
Fig 2.
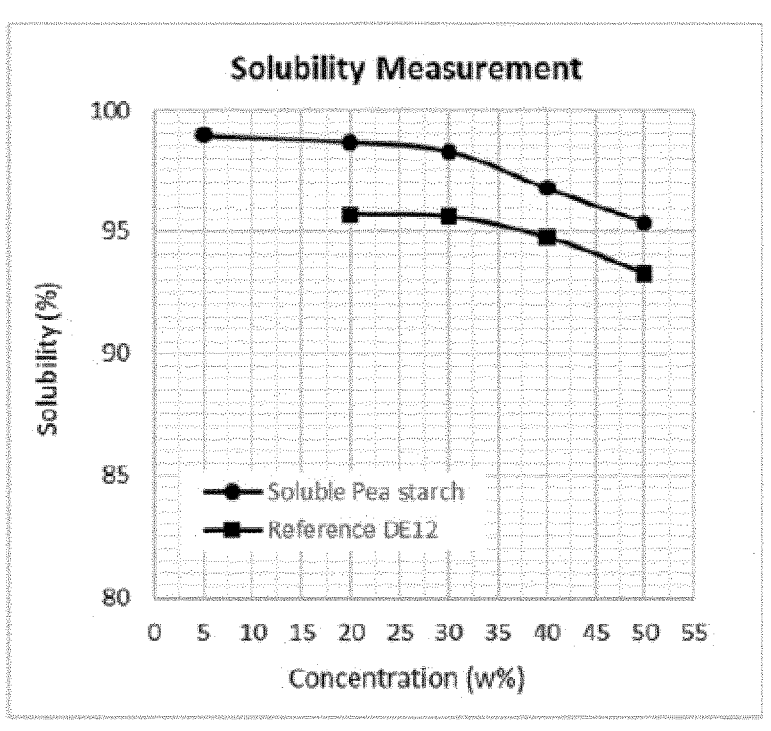

Mixing tank     Pressure reactor     Homogenizer     Ultrasonic device     Spray dryer

HIGHLY SOLUBLE PEA STARCH AS REPLACER OF MALTODEXTRIN

The present invention deals with a highly soluble leguminous starch produced by physical means (clean process), i.e. without addition of any chemicals or enzymes, and its use as maltodextrin alternative for bakery, sauce and dressing, dairy and beverage, more specifically for flavor encapsulation. More preferably, this leguminous starch is pea starch.

Hence, the present invention concerns a process that consists essentially in cooking starch-water mixture and then sonication of the solution obtained in particular conditions.

STATE OF THE ART

Starch is undeniably the most important polysaccharide in the human diet. It is only second to cellulose in terms of abundance of organic compounds in the biosphere.

The attractiveness of starch usage in the food and non-food industries could be ascribed to its cheapness, abundance, biodegradability and non-toxic nature. Starches are easily obtained from various botanical sources, e.g., cereal, legume, root and tuber and green fruit.

The need for native starch modification is due to the inherent deficiencies in its properties.

Native starches are insoluble in water, easily retrograde with associated syneresis and most significantly gels and pastes produced by native starches are unstable at high temperature, pH and mechanical stress.

Due to these inherent native starch inadequacies, there is need for modification to better the functional and physicochemical properties for suitable industrial applications.

Modification of starches can be broadly divided into physical, chemical, biotechnological and enzymatic or their combinations properly called dual modification.

Amongst them, physical methods are more acceptable since they are general chemical-free and hence considered safer for human consumption.

Physical modification of starch is more connected to the emerging concept of "clean label", "green technology" or "sustainable technology" for environmentally friendly applications.

Indeed, consumers are demanding more transparency about the ingredients in their foods, driving increased interest in ingredients that meet "clean label" guidelines.

Clean labeling could be any one or more of the following:
Recognizable ingredients
Minimal ingredients
Minimally processed
No artificial ingredients
No preservatives
Non-GMO
All-natural
Organic
Country of origin Physical modification of starch can improve water solubility and reduce particle size. The methods involve the treatment of starch granules under different temperature/moisture combinations, pressure, shear and irradiation.

Physical modification also includes mechanical attrition to change the particle size of starch granules.

Physical modification techniques are generally given preference as they do not involve any chemical treatment that can be harmful for human use.

The broad classification of starch physical modification into those that are thermal and others that is non-thermal.

The thermal processes involve:
The ones in which the starch granule structures are destroyed (all pre-gelatinization processes), and
The ones in which the granules are preserved (hydrothermal processes: annealing and heat-moisture treatment).

In pre-gelatinization, the granular structure of starch is totally destroyed as a result of heating, there is de-polymerization and fragmentation and so the molecular integrity of the starch is not preserved.

Therefore, pre-gelatinized starches are starches that have undergo gelatinization and consequently are depolymerized, fragmented and the granular structure is entirely destroyed as a result of cooking. The pre-gelatinization process is achieved by drum drying, spray drying and extrusion cooking. The properties associated with pre-gelatinized starches permits instant dissolution in cold water without heating.

Due to the harsh treatment (gelatinization and severe drying) used to obtain pre-gelatinized starches, it is porous, possessed higher water absorption index and water solubility index than that of the native starches.

However, there are certain limitations associated with pre-gelatinized starches which have reduced its applications in certain foods.

These include grainy texture, inconsistent and weak gels. These demerits have been surmounted by the development of granular cold water swelling starch. The latter can exhibit cold water thickening despite keeping its granular integrity, it possesses higher viscosity, more homogeneous texture with higher clarity and has more processing tolerance than pre-gelatinized starches.

Unlike native starch, they can rapidly absorb water and increase their viscosity at ambient temperature. This useful functionality has made them applicable in a range of products synthesized at low temperature containing heat-labile components (e.g., vitamins and coloring agents) and instant food.

Undeniably, the functional and physicochemical properties of various modified starches determine their applications in the food industry.

Unlike pre-gelatinization, annealing and heat-moisture treatment involve heating starch in water at a temperature below the gelatinization temperature (GT) and above the glass transition temperature (Tg). Consequentially, the granular structure of starch is preserved.

The physical non-thermal processes involve methods dealing with the preservation of food as a result of their impact on microbial organisms that cause fermentation.

These are processes that use pressure, ultrasound (US), pulsed electric field (PEF) and radiation to manipulate the physicochemical and functional properties of starches.

Ultrasound food processing technology uses frequency in the range of 20 KHz to 10 MHz. Ultrasound is the sound that is above the threshold of the human ear (>18 KHz). It is produced with either piezoelectric or magnetostrictive tranducers that generate high energy vibrations. These vibrations are amplified and transferred to a sonotrode or probe, which is in direct contact with the fluid.

Some merits as a consequent of ultrasound utilization in food processing are processing time reduction, energy efficiency and eco-friendly process. Other advantages of ultrasound are reduction of processing temperature, batch or continuous process can be utilized, increased heat transfer, deactivation of enzymes and possible modification of food structure and texture.

The ultrasound methods have been applied to several kinds of native starch (sweet potato, tapioca, potato and corn) and polysaccharides.

When native corn starch was subjected to High Power Ultrasound (HPU) treatment (24 KHz), the crystalline region of the modified corn starch granules was observed to be distorted.

The best way for molecular weight reduction of polysaccharides such as starch and chitosan is to treat their aqueous solution with 360 KHz US. The degradation of starch by applied ultrasound has been ascribed to OH radical formation and mechanochemical effects.

High power ultrasound is very significant in the following fields of food processing; filtration, crystallization, homogenization, extrusion, de-foaming, viscosity alteration, separation, emulsification and extraction. These unit operations are very important in the separation of gross product into its various components. Other applications of ultrasound include inactivation of enzymes and bacteria by splitting their cell membranes due to the violence of cavitation and the production of free radicals.

Modification of starch is an ever evolving industry with numerous possibilities to generate novel starches which includes new functional and value added properties as demanded by the industry.

In the field of the present invention, the applicants were more particularly interested in the preparation and the use in food applications of maltodextrins.

Maltodextrins are polymers of saccharides that consist of glucose units, primarily linked by $\alpha$-1,4 glucosidic bounds. These starch derivatives are commonly prepared from corn, rice, potato starch or wheat. Even though they come from plants, they are highly processed.

Maltodextrins are indeed classically obtained from enzymatic hydrolysis with or without acid but to a lower extent than that required to produce starch syrups. Maltodextrins are available in different molecular weights as dextrose equivalent (DE) according to the production method and source. The DE is expressed as a percentage of glucosidic-bound hydrolysis, showing their reducing power.

Maltodextrins provide good oxidative stability to oil encapsulation but exhibit poor emulsifying capacity, emulsion stability and low oil retention. Maltodextrins with 10 to 20 DE fit in for use as coating materials and show the highest retention of flavor. Moreover, maltodextrins are a good compromise between cost and effectiveness, bland in flavor, have low viscosity at high solids ratio, and aqueous solubility, resulting in their interest, value for encapsulation. Therefore, maltodextrin is a versatile ingredient in food industrial and has large application in food industries including food and beverage, sauce and dressing, bakery, dairy, flavor encapsulation . . . .

However, it is not consumer and Consumer Packaged Goods (CPG) friendly for due to clean label concerns. Indeed, to increase the solubility, classical ways to hydrolyze starch needs acid and/or enzymes to chemically decompose the long chains of starch molecules. The problems associated with those technologies include:

1. Add foreign components into natural materials,
2. High operational costs caused by adding and then removing the foreign components,
3. Additional capital costs for the adding and removing steps.

For that reason, a certain number of alternatives have been developed to produce starch derivatives having functionalities (as solubility) similar to maltodextrin that will have high market potential based on Customer feedback and Marketing strategy.

However, if various commercial products exist like cold-water soluble starch or pre-gelatinized starches, their solubility is often much lower than maltodextrin and therefore cannot substitute the use of maltodextrin.

Therefore, to respect the wishes of the consumers, there is a need in the corresponding field to offer a "clean label" solution.

The Applicant found that the solution goes through the to use physical means for starch hydrolysis, to eliminate the addition of chemical/enzyme, to generate clean label soluble starch, and to meet the customers' demands and market trend on green products.

However, it does not exist in the state of the art very efficient technical alternative way to produce maltodextrin-like products.

The most commonly applied thermal treatment is that used to make pregelatinized starches. As already discussed, these starches have been completely cooked, i.e., pasted, and dried under conditions that allow little or no molecular reassociation. They are described as being cold-water soluble, although many such products will develop additional viscosity upon heating aqueous dispersions of them. Nevertheless, even if the resulting pregelatinized starches are more soluble, this solubility is low, usually less than 50%, far from that of maltodextrins.

Depolymerisation also occurs during the pregelatinisation processes. The molecular weights of starch amylose and amylopectine usually decrease by factors 1.5 and 2.5 respectively. However, this thermal process needs high temperature treatment (>140° C. during 2 to 12 hours) and the heated starch solution obtained contains high concentration of compounds presenting a low degree of polymerization (DP) content (DP<6).

Physical non-thermal processes have been developed in that perspective: microwave, milling or sonication directly on native starch.

However, the heating of aqueous slurry of starch granules using microwaves is difficult to implement on an industrial scale.

The milling mechanically reduces particle sizes of starch granules to less than 20 micrometers, but it is very energy-intensive consumption. Furthermore, it is not possible to achieve the desired solubility.

Ultrasound treatment of native starch generates cavitation and radiations to decompose starch molecules. Ultrasonic depolymerization is a nonrandom process where chain scissions near the center of largest molecules are favored.

Ultrasonic degradation of a polymer leads to control of molecular weight, but needs long processing time and extra strong intensity, which limits the processing efficiency.

Moreover, this ultrasonic treatment has two main constraints, as presented by Isono et al, in their paper entitled *Ultrasonic degradation of waxy rice starch*, 1994, in Biosci. Biotech. Biochem., 58, 1779-1802:

Choice of waxy rice starch because of its solubility in (hot) water

Drive the sonication at a temperature of 60° C. to promote the reaction at a temperature where gelatinization starts, and because of the difficulty in temperature control and loss of water at higher temperatures.

A proposed promising technology was to combine sonication and gelatinization of starch.

However, the aim was, as described by Iida et al, in their paper entitled *Control of viscosity in starch and polysaccharide solutions with ultrasound after gelatinization*, 2008, in Innovative Food Sciences and Emerging Technologies 9, 140-146, to reduce viscosity of pre-gelatinized starch for spray drying. The gelatinization process is thus conducted at a temperature less than 95° C. following by ultrasonic irradiation applied for 30 minutes, and produce:

Starch with improved solubility for spray drying,

Starch solubility improved at higher solution temperature (≥65 C), but not in cold water (the cold water solubility (water at around 20° C.) of the product is less than 30%).

Therefore, there is still a very strong interest in seeking new processing methods for producing alternatives to malto-dextrin.

SUMMARY OF THE INVENTION

The present invention relates to a highly soluble legumi-nous starch having:

A content of oligosaccharides with a Degree of Polym-erization (DP) of 1 and 2 of less than 10% in weight, more preferably less than 6%, A content of oligosaccharides with a DP of 3 to 20 of more than 50% in weight, more preferably more than 70%, A water solubility of more than 90% in weight, more preferably more than 95%, A viscosity of less than 500 cP, more preferably of less than 100 cP and characterized by:

An $\alpha$-1,4/$\alpha$-1,6 ratio between 25 to 35%, preferably between 28 to 32%.

The present invention is also relative to a process com-prising, more preferably consisting in the following steps:

Preparation of a starch-water mixture containing starch,

Gelatinization of the starch-water mixture,

Cooking of the gelatinized starch,

Optionally, homogenization of the cooked solution,

Sonication of the optionally homogenized cooked solu-tion,

Optionally, refining of the sonicated solution, evaporation to concentrate the solution, and drying of the concen-trated solution to obtain a powder product.

The invention concerns also its use as alternative to maltodextrin for bakery, sauce and dressing, dairy and beverage, more specifically for flavor encapsulation (as carrier for flavor encapsulation) but also for the preparation of fat free vinaigrette or the preparation of powder beverage formulation such as tropical punch mix or energy beverage.

BRIEF DESCRIPTION OF THE SEVERAL VIEWS OF THE DRAWING

FIG. 1 illustrates the DP distribution of the pilot broduct compared to the reference sample.

FIG. 2 illustrates the improvement in cold-water solubil-ity achieved by increasing cooking temperature and ultra-sonic intensity.

DETAILED DESCRIPTION OF THE INVENTION

Figure 3:
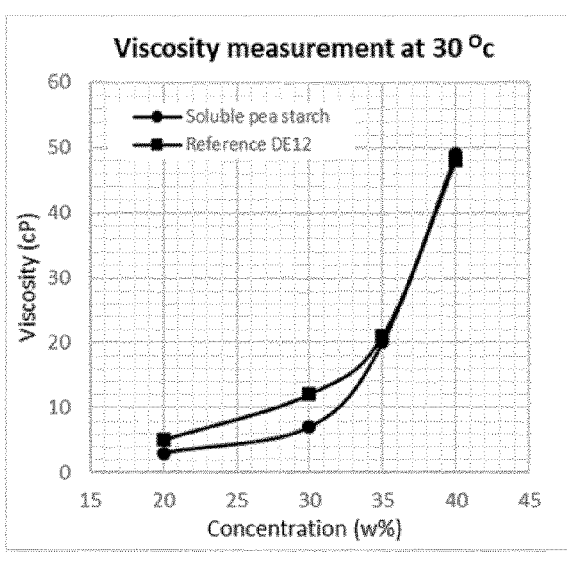
FIG. 3 presents the viscosity measurements of the pilot product sample and the reference sample.
Figure 3:
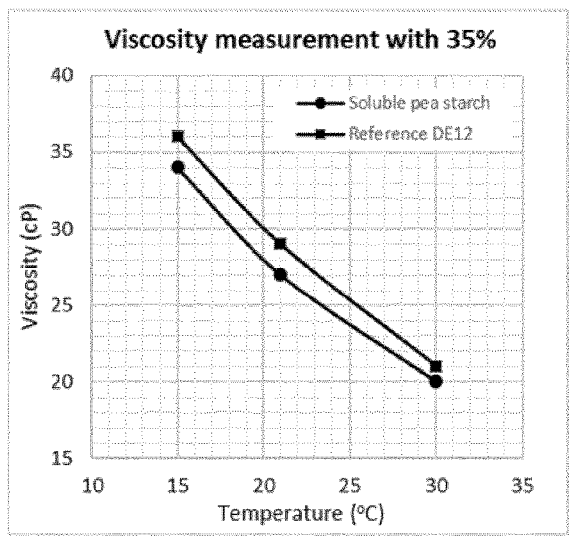

The invention relates to a highly soluble leguminous starch having:

A content of oligosaccharides with a Degree of Polym-erization (DP) of 1 and 2 of less than 10% in weight, more preferably less than 6%, A content of oligosaccharides with a DP of 3 to 20 of more than 50% in weight, more preferably more than 70%, A water solubility of more than 90% in weight, more preferably more than 95%, A viscosity of less than 500 cP, more preferably of less than 100 cP, And characterized by:

An $\alpha$1,4/$\alpha$1,6 ratio determined by $^{13}$C NMR between 25 to 35%, preferably between 28 to 32%.

According to the invention, said leguminous starch has an amylose content ranging between 25 and 60 percent by weight (dry/dry) and can be embodied as pea starch, espe-cially pea starch having an amylose content of at least 30 percent but less than 50 percent by weight.

With such a profile (which, to the Applicant's knowledge, has never been described), the high soluble starch or highly soluble starch according to the invention has a profile equivalent to maltodextrin (in terms of DP content, solubil-ity, viscosity), but a structure nearly identical to that of the native starch (in terms of a 1,4/$\alpha$1,6 ratio), from which it is prepared.

This could notably also be proven by the fact that the highly soluble starch according to the invention is blue in the starch iodine-test whereas, as the man skilled in the art knowns, conventional maltodextrin is typically brown.

The measure of the content of oligosaccharides with a Degree of Polymerization (DP) of 1 and 2; and of 3 to 20; is typically determined by the industrial standard carbohy-drates analysis method.

Thus, high pressure liquid chromatograph with ion-ex-change resin in silver form, AMINEX HPX-42A resin, was employed. Area at certain retention time corresponding to an individual DP value was recorded; the percentage of that particular DP was calculated as:

$$\% \ DP = \text{Individual } DP \text{ Area/Summation of all } DP \text{ Areas}$$

The high soluble pea starch has a content of oligosaccha-rides with a Degree of Polymerization (DP) of 1 and 2 of less than 10% in weight, more preferably less than 6%, and a content of oligosaccharides with a DP of 3 to 20 of more than 50% in weight, more preferably more than 70%.

By comparison, the maltodextrin GLUCIDEX® 12 com-mercialized by the Applicant has a content of oligosaccha-rides of DP1 and DP2 of about 7% and a content of oligosaccharides with a DP of 3 to 20 of about 91%.

The solubility has been determined by the method given in the Example 1.

The high solubility pea starch presents a water solubility of more than 90% in weight, more preferably more than 95% By comparison, the maltodextrin GLUCIDEX® 12 presents a water solubility of more of about 93%.

The viscosity has been measured by the method given in the Example 1.

The high solubility pea starch presents a viscosity of less than 500 cP, more preferably of less than 100 cP.

By comparison, the maltodextrin GLUCIDEX® 12 pres-ents a viscosity of less about 600 cP.

However, if the high soluble pea starch of the invention presents all these properties in common with maltodextrines, it is definitively not a maltodextrin.

Indeed, the high soluble pea starch of the invention has preserved natural form/structure of native pea starch, while conventional maltodextrin has different starch structure.

It can be illustrated by the $\alpha$1,4/$\alpha$1,6 ratio of the macro-molecule, determined by RMN [13]C.

The RMN $^{13}$C methodology followed is based on the work of:

Gidley, Michael J. (1985) in Carbohydrate Research, 139, 85-93.

Schmitz, Sarah. (2009) in Macromolecular Bioscience, 9, 506-514

Tizzotti, Morgan J. (2011). Journal of Agricultural and Food Chemistry, 59, 13, 6913-6919.

The procedure is the following:

1. Weight 10±0.05 mg starch sample.
2. Add 1.0 mL of anhydrous DMSO-d6 contained 0.5% (w/w) LiBr to the sample.
3. Add a tiny stir bar into the mixture and incubate the sample overnight at 80° C. and 300 rpm.
4. Cool the sample to room temperature.
5. Add 0.5 mL of sample mixture to the NMR tube.
6. Add 5.66 µL of deuterated trifluoroacetic acid (dl-TFA) to the medium just before the NMR measurement.
7. Analyze the sample with 1H NMR, obtain the 1H NMR spectra at 70° C.:

The conditions:

Larmor frequency of 500.13 MHz

12 µs 30° pulse

A repetition time of 15.07 s

An acquisition time of 3.07 s

A relaxation delay of 12 s 300 scans.

For the measurements:

α-1,4 linkages: peak intensity at 5.11 ppm,

α-1,6 linkages: peak intensity at 4.75 ppm

So, the high soluble pea starch of the invention has an α-1,4/α-1,6 ratio between 25 to 35%, preferably between 28 to 32%.

By comparison:

native pea starch presents a typical α-1,4/α-1,6 ratio of about 30% to 31%

GLUCIDEX® 12 has an α-1,4/α-1,6 ratio of about 22% to 23%

Such product can be advantageously used in food application such as for flavor encapsulation, as exemplified below.

The invention relates also to a method of preparation of a high soluble starch that comprises or consists in:

Preparation of a starch-water mixture containing starch,

Gelatinization of the starch-water mixture,

Cooking of the gelatinized starch,

Optionally, homogenization of the cooked solution,

Sonication of the optionally homogenized cooked solution,

Optionally, refining of the sonicated solution, evaporation to concentrate the solution, and drying of the concentrated solution to obtain a powder product.

According to the present invention, the term "high soluble starch" means a water solubility of starch (water at around 20° C.) of more than 90% in weight, more preferably more than 95%.

First Step: Preparation of a Starch-Water Mixture.

Target: prepare a slurry containing starch at 5 to 20% by weight with respect to the total weight of the slurry.

Starch used in that step may be from various botanical sources, e.g., cereal, legume, root and tuber and green fruit, more preferably from legume.

By "legume" for the purposes of the present invention, is understood to mean any plant belonging to the families, Mimosaceae or Papilionaceae of and in particular any plant belonging to the family of Papilionaceae, for example, the pea, haricot bean, broad bean, horse bean, lentil, alfalfa, clover or lupine.

This definition includes in particular all the plants described in any one of the Tables contained in the article by R. HOOVER et al. entitled "Composition, Structure, Functionality and Chemical Modification of Legume Starches: a review" (Can. J. Physiol. Pharmacol. 1991.69 pp. 79-92).

Preferably the starch useful for the present invention is a native leguminous starch.

Preferably, the legume is selected from the group comprising pea, fava bean, haricot bean, broad bean and horse bean, more preferably pea or Faba bean starch.

Advantageously, it is pea, the term "pea" being considered here in its broadest sense and including in particular:

all the wild varieties of "Smooth PEA", and all the mutant varieties of "smooth pea" and of "wrinkled pea" ("wrinkled PEA") and this, regardless of the uses to which said varieties are generally intended (human consumption, animal nutrition and/or other uses).

Said mutant varieties are especially those referred to as "r is mutants", "Rb mutants", "rug 3 mutants", "rug mutants 4", "rug mutants 5" and "LAM mutants" as described in the article by The C-liter HEYDLEY et al. entitled "Developing novel pea wrinkled pea" Proceedings of the isgri Symposium of the Industrial Biochemistry and Biotechnology Group of the Biochemical Society, 1996, pp. 77-87.

According to another advantageous variant, the legume is a plant, for example a variety of pea or of horse bean, giving seeds comprising at least 25%, preferably at least 40%, by weight of starch (dry/dry).

"Legume starch" by, is understood to mean any composition extracted and this, of case in whatever way, from a legume and in particular from a Papilionaceae, and whose starch content is greater than 40%, preferably greater than 50% and even more preferably greater than 75%, these percentages being expressed as dry weight relative to the dry weight of said composition.

Advantageously, this starch content is greater than 90% (dry/dry). It may in particular be greater than 95%, including greater than 98%.

Starch is then gelatinized and then cooked at higher temperature for multiple purpose:

Swelling starch granular,

Gelatinize starch and/or loose starch coils,

Reducing size and structure of starch by partially break down long molecular chains.

Second Step: Gelatinization of the Starch-Water Mixture or Starch Slurry.

Gelatinized starches can be obtained by treatment of gelatinization of hydro-thermal native starches in particular by steam cooking, jet-cooker cooking, cooking on a drum, cooking in kneader/extruder systems followed by drying for example in an oven, by hot air on a fluidized bed, on rotating drum, by atomization, by extrusion or by lyophilization.

The slurries of starch are typically heated at a temperature between 50 to 90° C., for 1 to 60 minutes.

If pea starch is chosen as botanical source, the gelatinization is performed at a temperature between 72 to 75° C., for 10 to 15 minutes.

Third Step: Cooking of the Gelatinized Starch

This cooking step or further heating treatment is carried out at a temperature between 100 to 200° C., at a pressure between 1.43 to 12.55 bar.

If pea starch is chosen as botanical source, the cooking is performed at a temperature between 145 to 175° C. at a pressure between 4.16 to 8.94 bar. The resulting gelatinized and cooked starch is optionally passed through a shearing device such as homogenizer.

Fourth Step: Optionally, Homogenization of the Cooked Solution

It is made at a temperature between 500 to 1000 bar with back pressure between 50 to 100 bar, at a temperature between 15 to 95° C.

If pea starch is chosen as botanical source, the homogenization is performed at a pressure between 700 to 800 bar with back pressure between 70 to 80 bar, at a temperature between 45 to 55° C.

Sonication further breaks down the bounds between the partially decomposed starch molecules.

Fifth Step: Sonication of the Starch Solution

It is made at a frequency between 10 to 360 kHz, at a temperature between 30 to 80° C.

If pea starch is chosen as botanical source, the sonication is performed at a frequency of 15 to 25 kHz, more preferably at 20 kHz, at a temperature between 40 to 45° C.

The resulted product is evaporated as syrup or can be dried into powder form using dryer such as drum dryer, flash dryer, spray dryer, freeze dryer.

For example, by spray drying, the inlet temperature is between 150 to 250° C., more preferably between 170 to 190° C.; the outlet temperature is between 60 to 120° C., more preferably between 80 to 90° C.

So the product obtained:

Is cold water soluble, i.e. solubility ≥90% around 20° C.,

Have similar properties as maltodextrin (oligosaccharides DP2-DP20 content >50%), Is clean label (no chemical additives).

EXAMPLE

This invention will be better understood in light of the following example which are given for illustrative purposes only and do not intend to limit the scope of the invention, which is defined by the attached claims.

Example 1. Preparation of the Soluble Pea Starch Following the Invention

Material and Equipment

Raw material: Native pea starch N735 (commercialized by the Applicant),

Pressure cooker: Parr pressure reactor 8500

Homogenizer: GEA model

Ultrasonic equipment: Osonica 02000

Process, Piloting Procedure and Operating Conditions

Figure 5:
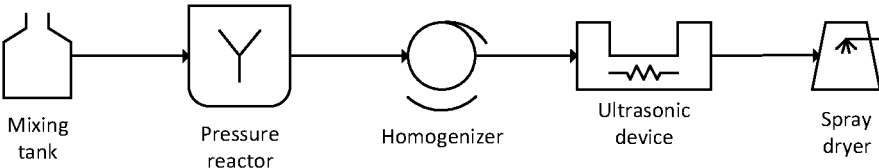
FIG. 5 is a schematic representation ofthe pilot process.

Process:

The pilot process is schematically represented in FIG. 5.

Pea starch and water are mixed in the mixing tank and cooked in pressure reactor. After cooking, the solution was homogenized and sonicated, then spray dried to form soluble pea starch powder.

Piloting Procedure and Operating Conditions:

The steps of the piloting procedure and related operating conditions are listed below:

Mix 750 g pea starch N735 with 14,250 g tap water to form 15,000 g starch-water mixture with starch concentration of 5%.

The mixture was stirred in the mixing tank at room temperature for 15 minutes.

Cook the mixture in the pressure reactor at 75° C. for 10 minutes for gelatinization.

Continue cooking the solution until 175° C. and keep there for 10 minutes.

Cool down the cooked solution to 80° C.

Homogenize the solution at 800/80 bar pressure and about 65° C. for 15 minutes.

Sonicate the solution at 90% intensity, 45° C. and 20 kHz frequency for 5 minutes.

Spray dry the solution with the condition of inlet temperature 185° C. and outlet temperature 90° C.

Sample Analysis

Solubility measurement

Collect 45 ml sample in 50 ml centrifuge tube at room temperature.

Centrifuge the sample at 3000 g for 5 minutes.

Supernatant was collected and weighted.

Dry the supernatant at 130° C. for two hours until constant weighting.

Cool the dried supernatant in desiccator at room temperature for 1 hour.

The solubility was calculated by the question:

$$100*m*(M+P)/(P1*P)$$

where: M=mass of water, P=mass of starch, P1=mass of supernatant, m=mass of dried residual.

Measurement was repeated twice for accuracy.

Dextrose equivalent and carbohydrate profile measurements

Dextrose equivalent (DE) of pilot samples were determined by any method well known in the art.

The carbohydrate profiles were determined by HPLC with double-silver column.

Viscosity measurement

Dissolve pilot products in deionized (DI) water at room temperature to form solutions with different concentrations.

Viscosity of the solutions was measured with Brookfield II viscometer using #21 spindle.

Temperature of the solutions were controlled with circulated water bath.

Results and Discussion

Dextrin equivalent and carbohydrate profile

Dextrin equivalent (DE) and carbohydrate profile (DP) are important information about the pilot product properties.

Labeled as soluble starch, the product must soluble in cold water (water at around 20° C.) and contains low DP1 and DP2 concentration as well. For the feasibility trials, the current requirement for the product is: DE=12, and DP1+DP2<5%.

Table 1 is the results of DE and DP measurements of the pilot products, with different batches. DE and DP results of commercial maltodextrin with DE12 (GLUCIDEX® 12 commercialized by the applicant) are also included on the table as comparison.

TABLE 1

| | | | | | |
|---|---|---|---|---|---|
| Results of DE and DP measurements | | | | | |
| | Pilot batch | | | | |
| Properties | PS-051120-OD | PS-051420-SL | PS-051420-SD | PS-061920-CTS | GLUCIDEX ® 12 |
| DE | 12.87 | 9.88 | 11.01 | 11.25 | 10.16 |
| Carbohydrate Profile (%) | | | | | |
| DP21+ | 48.35 | 47.81 | 38.50 | 50.28 | 53.07 |
| DP11-20 | 20.96 | 20.75 | 32.61 | 18.87 | 15.87 |
| DP10 | 2.91 | 3.06 | 0.00 | 2.73 | 2.61 |
| DP9 | 3.10 | 3.46 | 0.00 | 2.92 | 3.07 |
| DP8 | 3.38 | 3.30 | 3.36 | 3.24 | 3.38 |
| DP7 | 3.33 | 3.45 | 3.36 | 3.21 | 4.28 |
| DP6 | 3.36 | 3.51 | 3.50 | 3.34 | 4.36 |
| DP5 | 3.33 | 3.48 | 3.45 | 3.39 | 3.46 |
| DP4 | 3.18 | 3.25 | 3.28 | 3.30 | 3.24 |
| Maltotriose | 3.40 | 3.04 | 3.03 | 3.12 | 3.83 |
| Maltose | 2.65 | 2.77 | 2.72 | 2.86 | 2.33 |
| Dextrose | 1.70 | 1.77 | 2.08 | 2.19 | 0.51 |
| Fructose | 0.35 | 0.35 | 0.00 | 0.44 | 0.00 |
| DP1 + DP2 | 4.70 | 4.89 | 4.80 | 5.49 | 2.84 |

The results indicate that the pilot products have DE values around 11 with the range of 9.88 to 12.87; and have DP1+DP2 concentration around 5% (between 4.5 and 5.5%).

For comparison, FIG. 1 is the DP distribution of the pilot product and the reference sample, plotted with the data from carbohydrate profile measurement. The DP distribution of the pilot product is similar to the reference sample.

Solubility

Another important property parameter is solubility. The soluble starch should have high enough solubility in cold water in order to be used as an alternative of maltodextrin.

Drying method affect the solubility. Spray drying reduces the solubility of the soluble starch from 86.95% before drying to 28.61% after the drying.

By modifying the process condition through increasing cooking temperature and ultrasonic strength, the products cold water solubility is improved, always above 95% even with high concentration, as shown on FIG. 2.

Viscosity

Figure 4:
FIG. 4 shows the sample ofthe pilot product before and after dissolution.
Figure 4:

Viscosity directly affects the product applicability and processing-ability; it also reflects the effects of processing conditions on the final products. Currently, viscosity of the commercial DE12 sample is used as reference. The FIG. 3 is the measurement results of the pilot product sample and the reference one. The result indicates two samples have very similar rheology behavior. FIG. 4 shows the sample of the pilot product before and after dissolution.

Comparative Studies

The data are presented in the following table:

| Sample | Starch Content | Solubility | Viscosity | α-1,4/α-1,6 ratio | DP1 and DP2 content | DP3 and higher | DE |
|---|---|---|---|---|---|---|---|
| Native pea starch N735 commercialized by the Applicant | >99% | <2% | 20 cP | 30-31% | 0.0% | / | / |
| Highly Soluble pea starch of the present invention | <10% | >90% | <500 cP | 25-35% | <10% | >90% | 12 |
| GLUCIDEX ® 12 commercialized by the Applicant | ND* | >93% | <600 cP | 22-23% | 3-7% | >90% | 12 |

*ND: Not determined, because maltodextrin has no starch content (Iodine test not blue)

It is clear that the highly soluble pea starch of the invention is functionally a maltodextrin and structurally a starch.

Example 2. Evaluation of the High Soluble Pea Starch Comparing GLUCIDEX® 12 in Flavor Encapsulation The objective is here to compare soluble pea starch (Lot SPS-061920 of Example 1) vs GLUCIDEX® 12 in the flavour encapsulation function.

Preparation of Emulsions and Spray Drying

Powder Blend

| Ingredient | Solids:Water Ratio | Wall:Core Ratio | Malto:Gum Ratio | Percentage |
|---|---|---|---|---|
| Water | 55% | — | — | 55 |
| Glucidex 12 or soluble pea starch | 45% | 80% | 80% | 28.8 |
| Prehydrated Gum Acacia FT | | | 20% | 7.2 |
| Orange Oil | | 20% | — | 9 |
| Total | | | | 100 |

Emulsion Preparation

For the standard formula with GLUCIDEX® 12 batch size was 6 L.

Water was weighed at room temperature while mixing with a SILVERSTON benchtop high shear mixer at 2000 rpm with a large hole dispersing head.

GLUCIDEX® 12 & gum arabic were pre-weighed and mixed together.

The mixture was then mixed into the water at an increasing higher mixer speed (2000→4000→6000→9000 rpm) for 15 minutes or until well dispersed with no visible lumps.

The mixer head was changed over to a medium slotted screen. Orange oil was added slowly and mixed at 9000 rpm for 5 min until a coarse emulsion formed.

The emulsion was homogenized in a two stage high-pressure homogenizer at 500 bar (450 bar 1st stage, 50 bar 2nd stage) to form the fine emulsion.

Spray Drying Conditions

The emulsion was heated to 60° C. and kept stirring while feeding to the spray dryer through a peristaltic pump.

The flow rate was automatically adjusted as the liquid was feeding into the spray dryer to maintain the inlet temperature constant.

| Spray drying parameters | Standard with Glucidex 12 or soluble pea starch |
|---|---|
| Inlet temp | 185 C. |
| Outlet temp | 90 C. |
| Slurry temp | 60 C. |
| Pump rate | Varies automatically depending on the feeding to maintain the inlet temperature. |

Analytical Methods

Viscosity of Ingredients

Method: 45% (w/w) slurries were made by using GLUCIDEX® 12 and soluble pea starch at room temperature and the viscosities of the slurries were measured at 20° C. at 160 rpm on the RVA for 10 minutes with 28 g sample in container.

Measurement taken at 10 min point.

Density of the Liquid Emulsion

Method: density of the emulsion pre-spray drying and the reconstituted emulsion were measured using a 50 cc density cups.

Refractive Index of Liquid Emulsions and Reconstituted Slurries

Method: measured using Bellingham and Stanley RFM 340 benchtop refractometer.

Particle Size Distribution of Liquid Emulsion and Reconstituted Slurries

Method: Particle size distribution of the homogenized liquid emulsions and the reconstituted slurries were analyzed using the MALVERN 3000 laser particle size analyzer. SOPs adjusted based off measured refractive index and emulsion density. Results are an average of five measurements.

Moisture Content

Method: Moisture content of the spray-dried powders was determined using CEM Smart-6 moisture analyzer. Results are an average of three measurements.

Bulk Density of Spray Dried Flavor Powder

Method: Powder was allowed to flow from a funnel three inches above a tared density cup. Once overfilled, density cup was leveled. Weight of powder was taken and density expressed as g/L. Results are an average of three measurements.

Color Measurement of the Liquid Emulsions and Reconstituted Slurries

Method: Color was measured using Hunter Mini-scan colorimeter for L*a*b* values. Results are an average of five measurements.

Fat Content of Spray Dried Flavor Powder

Method: Fat content was measure using CEM fat analyzer.

Yield Calculation

Method: The feed rate was calculated by monitoring the weight loss of the liquid emulsion within 20 min. The amount of dried powder was collected within the 20 min. The calculation was done as follows:

$$\% \text{ Yield} = \frac{\text{weight spray dried powder collected}}{\text{(amount of emulsion fed into spray drier)} * (0.45\% \text{ solids})} * 100$$

Three samples were collected during 1 hr and the average yield was calculated. The amount of dried product left in the cyclone was accounted for in the calculation.

Results

| Viscosities of ingredients | | |
| --- | --- | --- |
| Viscosity (cps) | Glucidex 12 (g/ml) | Soluble pea starch (g/ml) |
| 45% ds Slurry day = 0 | 227 | 174 |
| 45% ds Slurry day = +1 | 240 | 311 |

The viscosity of soluble pea starch was lower than that of GLUCIDEX®12. This shows that the average DE of the soluble pea starch could be higher than 12 DE and there could be higher number of smaller molecules in the product profile compared to GLUCIDEX® 12.

After 24 hrs, both GLUCIDEX® 12 and soluble pea starch showed increased viscosity possibly due to retrogradation.

However, the viscosity increases in larger for soluble pea starch than GLUCIDEX® 12 (possibly due to higher amylose content in pea starch).

Soluble pea starch slurry was brown in color whereas GLUCIDEX® 12 was white in color.

| Density of the liquid emulsions | | |
| --- | --- | --- |
| Liquid density | Glucidex 12 (g/ml) | Soluble pea starch (g/ml) |
| 45% ds emulsions for spray drying | 1.29 | 1.29 |
| 45% ds Reconstituted spray dried flavor powder | 1.34 | 1.29 |

Densities of emulsions of GLUCIDEX® 12 and soluble pea starch were comparable. However, the reconstituted flavor powders of soluble pea starch showed slightly lower density compared to that of GLUCIDEX® 12.

| Color of emulsions | | | |
| --- | --- | --- | --- |
| Sample | L* | a* | b* |
| 45% ds emulsion with Glucidex 12 for spray drying | 78.95 | 1.56 | 58.07 |
| 45% ds Reconstituted spray dried powder with Glucidex 12 | 69.04 | 5.63 | 68.24 |
| 45% ds emulsion with soluble pea starch for spray drying | 77.67 | 0.02 | 45.52 |
| 45% ds Reconstituted spray dried powder with soluble pea starch | 68.98 | 2.9 | 46.43 |

Emulsion of GLUCIDEX® 12 was more yellow compared to the emulsion of soluble pea starch. The lower b-value for soluble pea starch emulsion also shows the lower yellowness compared to the GLUCIDEX® 12 emulsion.

| Refractive index of emulsions | |
| --- | --- |
| Sample | Refractive index |
| 45% ds emulsion with Glucidex 12 for spray drying | 1.39 |
| 45% ds Reconstituted spray dried powder with Glucidex 12 | 1.41 |
| 45% ds emulsion with soluble pea starch for spray drying | 1.39 |
| 45% ds Reconstituted spray dried powder with soluble pea starch | 1.40 |

Refractive index of both ingredients in emulsions and in reconstituted slurries are comparable.

| Particle size distribution | | | |
| --- | --- | --- | --- |
| Sample | Dx(10) | Dx(50) | Dx(90) |
| 45% ds emulsion with Glucidex 12 for spray drying | 0.216 | 1.17 | 8.60 |
| 45% ds Reconstituted spray dried powder of Glucidex 12 | 0.375 | 4.56 | 19.20 |
| 45% ds emulsion with soluble pea starch for spray drying | 0.056 | 0.95 | 17.40 |
| 45% ds Reconstituted spray dried powder of soluble pea starch | 0.303 | 1.41 | 13.30 |

The particle size distribution showed that mean particle (D50) size of the emulsions are comparable and the particle size is ~1 micron.

However, D90 showed that the particle size of GLUCIDEX® 12 is smaller than that of the soluble pea starch. (8.6 vs. 17.4).

Furthermore, the reconstituted slurries showed larger particle size for GLUCIDEX® 12 flavor powder compared to that of soluble pea starch for both mean particle size (D50) and the D90.

| Moisture content of spray dried flavors | | |
| --- | --- | --- |
| Moisture content of spray dried flavor powders | Glucidex 12 | Soluble pea starch |
| Percent (average) | 5.16 | 4.17 |

Moisture content of GLUCIDEX® 12 was slightly higher than soluble pea starch.

| Bulk density of spray dried flavors | | |
| --- | --- | --- |
| Bulk density of spray dried powder | Glucidex 12 | Soluble pea starch |
| g/L | 312 | 317 |

Bulk density of the spray dried flavor powders of GLUCIDEX® 12 and soluble pea starch are comparable.

| Color of spray dried flavor powders | | | |
| --- | --- | --- | --- |
| Sample | L* | a* | b* |
| Spray dried flavor powder with 12DE maltodextrin | 95.41 | −1.86 | 17.06 |
| Spray dried flavor powder with soluble pea starch | 94.13 | −1.21 | 14.19 |

Spray dried flavor powder of soluble pea starch showed slightly less yellowness compare to that of GLUCIDEX® 12.

| Fat content of spray dried flavor powder | | |
| --- | --- | --- |
| Fat content % | Glucidex 12 | Soluble pea starch |
| Average fat content | 5.72 | 5.66 |

Results showed that the fat content of spray dried samples were comparable.

| Yield | | |
| --- | --- | --- |
| | Glucidex 12 | Soluble pea starch |
| Percent yield t(average) | 69.6 | 85.4 |

Both GLUCIDEX® 12 and soluble pea starch gave more than 60% yield, which was the target for this application.

However, the yield of soluble pea starch was higher than that with GLUCIDEX® 12.

Conclusion

Based on the tests conducted, soluble pea starch showed lower viscosity and less yellow emulsion and spray dried powder compared to GLUCIDEX® 12. However, spray dried powders showed comparable results for density and moisture contents.

Soluble pea starch performed well in spray drying and provided a higher yield compared to GLUCIDEX® 12.

Even if the molecular profile of soluble pea starch lot used in this study may not be exactly comparable to the properties of GLUCIDEX® 12 mainly because of its lower viscosity, this product may be used as comparable ingredient to GLUCIDEX® 12.

Example 3. Evaluation of the Highly Soluble Pea Starch in Flavor Encapsulation Compared to GLUCIDEX® 12

The objective is here to compare two batches of the highly soluble pea starch of the present invention (batches 1 & 2) prepared as in Example 1, compared to two batches of GLUCIDEX® 12 (Lots 1 & 2) in the flavour encapsulation function.

Preparation of Emulsions and Spray Drying

| Powder blend | | | | |
| --- | --- | --- | --- | --- |
| Ingredient | Solids:Water Ratio | Wall:Core Ratio | Malto:Gum Ratio | Percentage |
| Water | 55% | — | — | 55 |
| Glucidex 12 or soluble pea starch | 45% | 80% | 80% | 28.8 |
| Prehydrated Gum Acacia FT | | | 20% | 7.2 |
| Orange Oil | | 20% | — | 9 |
| Total | | | | 100 |

Emulsion Preparation

Batch size was 6 L for all the runs.

Water was weighed into a large pot at room temperature (~18° C.) while mixing with a Silverson benchtop high shear mixer at 2000 rpm with a large hole dispersing head.

GLUCIDEX® 12 (or the highly soluble pea starch) & gum arabic were pre-weighed and mixed together.

The mixture was then added into the water at an increasing higher mixer speed (2000→4000→6000→9000 rpm) for 15 minutes or until well dispersed with no visible lumps.

The mixer head was changed over to a medium slotted screen. Orange oil was added slowly and mixed at 9000 rpm for 5 min. until a coarse emulsion formed.

The emulsion was homogenized in a two-stage high-pressure homogenizer at 500 bar (450 bar 1st stage, 50 bar 2nd stage) to form the fine emulsion.

The emulsion was homogenized in a two stage high-pressure homogenizer at 500 bar (450 bar 1st stage, 50 bar 2nd stage) to form the fine emulsion.

Spray Drying Conditions

The emulsion was heated to 60° C. and kept stirring while feeding to the spray dryer through a peristaltic pump.

The flow rate was automatically adjusted as the liquid was feeding into the spray dryer to maintain the inlet temperature constant.

| Spray drying parameters | Standard with Glucidex 12 or soluble pea starch |
| --- | --- |
| Inlet temp | 185 C. |
| Outlet temp | 90 C. |
| Slurry temp | 60 C. |
| Pump rate | Varies automatically depending on the feeding to maintain the inlet temperature. |

Analytical Methods

Viscosity of Orange Oil Emulsions

Method: Viscosity of emulsions made according to the method described above for spray drying were measured at 20° C. at 160 rpm on the RVA for 10 minutes with 28 g sample in container.

Measurement taken at 10 min. point.

Viscosity of Reconstituted Powders

Method: 45% (w/w) slurries were made by using spray dried flavor powders made with GLUCIDEX® 12 or the highly soluble pea starch at room temperature and the viscosities of the slurries were measured at 20° C. at 160 rpm on the RVA for 10 minutes with 28 g sample in container.

Measurement taken at 10 min. point. Viscosity at D+1 obtained after storing the emulsion at refrigerator for 1 day and bringing the temperature back to 20° C. before running in the RVA under the same conditions mentioned above.

Density of the Liquid Emulsion

Method: density of the emulsion pre-spray drying and the reconstituted emulsion were measured using a 50 cc density cups.

Refractive Index of Emulsions and Reconstituted Slurries

Method: measured using Bellingham and Stanley RFM 340 benchtop refractometer.

Particle Size Distribution of Liquid Emulsion and Reconstituted Slurries

Method: Particle size distribution of the homogenized liquid emulsions and the reconstituted slurries were analyzed using the Malvern 3000 laser particle size analyzer. SOPs adjusted based off measured refractive index and emulsion density. Results are an average of five measurements.

Moisture Content

Method: Moisture content of the spray-dried powders was determined using CEM Smart-6 moisture analyzer. Results are an average of three measurements.

Bulk Density of Spray Dried Flavor Powder

Method: Powder was allowed to flow from a funnel three inches above a tared density cup. Once overfilled, density cup was leveled. Weight of powder was taken and density expressed as g/L. Results are an average of three measurements.

Color Measurement of the Emulsions and Reconstituted Slurries

Method: Color was measured using Hunter Mini-scan colorimeter for L\*a\*b\* values. Results are an average of five measurements.

Fat Content of Spray Dried Flavor Powder

Method: Fat content was measure using CEM fat analyzer.

Yield Calculation

Method: The feed rate was calculated by monitoring the weight loss of the liquid emulsion within 20 min. The amount of dried powder was collected within the 20 min.

The calculation was done as follows:

$$\% \text{ Yield} = \frac{\text{weight spray dried powder collected}}{\begin{array}{c}(\text{amount of emulsion fed into spray drier})*\\(0.45\% \text{ solids}) \times 100\end{array}}$$

Three samples were collected during 1 hr and the average yield was calculated. The amount of dried product left in the cyclone was accounted for in the calculation.

Accelerated Storage Stability

Method: 100 g of spray dried flavor powder (with GLUCIDEX® 12 or soluble pea starch) was placed in a large container with the lid closed to fill only ¼ of the container, and stored at 45 C for 7 days, 14 days and 28 days.

During the storage, sample were shaken 2 days per week to redistribute the powders inside the containers.

After the storage, the sample containers were immediately removed and cool down to room temperature (~18° C.) and placed them in the freezer at −80 C until they were used for the analysis of limonene oxide products (target compounds—cis-limonene oxide, trans-carveol, cis-carveol, carvone).

VISCOSITIES OF ORANGE OIL EMULSIONS FOR SPRAY DRYING

| Viscosity (cps) | GLUCIDEX ®12 Lot 1 (g/ml) | GLUCIDEX ® 12 Lot 2 | High soluble pea starch Batch 1 | High soluble pea |
|---|---|---|---|---|
| 45% ds Slurry day = 0 | 181 | 177 | 332 | 225 |
| Average | | 179 | | 278.5 |

The viscosity of orange oil emulsion with soluble pea starch was higher than that of GLUCIDEX® 12.

VISCOSITIES OF RECONSTITUTED SPRAY DRIED POWDERS

| Viscosity (cps) | GLUCIDEX ®12 Lot 1 (g/ml) | GLUCIDEX ® 12 Lot 2 | high soluble pea starch Batch 1 (g/ml) | high soluble pea starch |
|---|---|---|---|---|
| 45% ds Slurry day = 0 | 312.5 | 335.5 | 295.5 | 285 |
| Average | | 324 | | 290.3 |
| 45% ds Slurry day = +1 | 381.5 | 417.5 | 367 | 377 |
| Average | | 399.5 | | 372 |

The viscosity of reconstituted flavor powder with GLUCIDEX® 12 was higher than that of the highly soluble pea starch.

Upon storing for d day, both flavor powders showed increased in viscosity.

The extent of thickening (increase in viscosity) for both ingredients are comparable (75.5 cPS vs 82 cPS for GLUCIDEX® 12 vs highly soluble pea starch).

DENSITY OF THE LIQUID EMULSIONS

| Liquid density | GLUCIDEX ®12 Lot 1 (g/ml) | GLUCIDEX ® 12 Lot 2 (g/ml) | high soluble pea starch Batch 1 (g/L) | high soluble pea starch Batch 2 (g/L) |
|---|---|---|---|---|
| 45% ds emulsions for spray drying | 130 | 129 | 120 | 120 |
| Average | 130 | | 120 | |

Density of emulsions of GLUCIDEX® 12 was slightly higher than that of the highly soluble pea starch.

DENSITY OF THE RECONSTITUTED POWDER EMULSIONS

| Liquid density | GLUCIDEX ®12 Lot 1 (g/ml) | GLUCIDEX ® 12 Lot 2 (g/ml) | high soluble pea starch Batch 1 (g/L) | high soluble pea starch Batch 2 (g/L) |
|---|---|---|---|---|
| 45% ds emulsions for spray drying | 126 | 127 | 120 | 126 |
| Average | | 127 | | 123 |

Densities of reconstituted powders are comparable.

COLOR OF EMULSIONS

| | L* | a* | b* |
|---|---|---|---|
| Sample GLUCIDEX 12 | | | |
| 45% ds emulsion with lot 1 for spray drying | 77.75 | 0.30 | 37.69 |
| 45% ds emulsion with lot 2 for spray drying | 78.19 | 0.21 | 37.12 |
| Average | 77.97 | 0.26 | 37.41 |
| 45% ds Reconstituted spray dried powder with lot 1 | 69.57 | 0.96 | 36.08 |
| 45% ds Reconstituted spray dried powder with lot 2 | 70.48 | 0.91 | 34.61 |
| Average | 70.03 | 0.94 | 35.35 |
| Sample high soluble pea starch | | | |
| 45% ds emulsion with Batch 1 for spray drying | 80.88 | −1.87 | 27.46 |
| 45% ds emulsion with Batch 2 for spray drying | 79.58 | −1.97 | 28.40 |
| Average | 80.23 | −1.92 | 27.93 |
| 45% ds Reconstituted spray dried powder with Batch 1 | 92.84 | −1.15 | 11.07 |
| 45% ds Reconstituted spray dried powder with Batch 2 | 93.49 | −1.19 | 10.30 |
| Average | 93.17 | −1.17 | 10.67 |

Emulsion of GLUCIDEX® 12 with orange oil was more yellow and bright compared to the emulsion of the high soluble pea starch. The lower b-value for soluble pea starch emulsion also shows the lower yellowness compared to the GLUCIDEX® 12 emulsion.

REFRACTIVE INDEX OF 45% DS EMULSIONS

| Sample | Emulsion prepared for spray drying | Reconstituted emulsions |
|---|---|---|
| GLUCIDEX ® 12 lot 1 | 1.40 | 1.41 |
| GLUCIDEX ® 12 lot 2 | 1.39 | 1.41 |
| Average | 1.40 | 1.41 |
| High soluble pea starch Batch 1 | 1.39 | 1.41 |

-continued

REFRACTIVE INDEX OF 45% DS EMULSIONS

| Sample | Emulsion prepared for spray drying | Reconstituted emulsions |
|---|---|---|
| High soluble pea starch Batch 2 | 1.39 | 1.41 |
| Average | 1.39 | 1.41 |

Refractive index of both ingredients in emulsions and in reconstituted slurries are comparable.

PARTICLE SIZE DISTRIBUTION (IN MICRONS) OF 45% DS EMULSIONS

| | Dx(10) | Dx(50) | Dx(90) |
|---|---|---|---|
| Sample | | | |
| Emulsion with lot 1 for spray drying | 0.291 | 1.81 | 10.6 |
| Emulsion with lot 2 for spray drying | 0.385 | 1.75 | 11.1 |
| Average | 0.338 | 1.78 | 10.85 |
| Reconstituted spray dried powder with lot 1 | 0.312 | 1.35 | 8.58 |
| Reconstituted spray dried powder with lot 2 | 0.306 | 1.31 | 7.68 |
| Average | 0.309 | 1.33 | 8.13 |
| Sample high soluble pea starch | | | |
| Emulsion with Batch 1 for spray drying | 0.579 | 11.2 | 23.8 |
| Emulsion with Batch 2 for spray drying | 0.541 | 10.0 | 20.9 |
| Average | 0.560 | 10.6 | 22.35 |
| Reconstituted spray dried powder with Batch 1 | 0.380 | 4.02 | 11.8 |
| Reconstituted spray dried powder with Batch 2 | 0.313 | 5.17 | 14.4 |
| Average | 0.347 | 4.60 | 13.1 |

Particle size distribution showed that particle size of GLUCIDEX®® 12 emulsions for spray drying and reconstituted emulsion are smaller than those of high soluble pea starch are.

However, both GLUCIDEX®® 12 and high soluble pea starch showed smaller particle sizes for the reconstituted emulsions compared to that of the emulsions for spray drying.

MOISTURE CONTENT OF SPRAY DRIED FLAVOR POWDERS

| | GLUCIDEX ® 12 Lot 1 | GLUCIDEX ® 12 Lot 2 | High soluble pea starch Batch 1 | High soluble pea starch Batch 2 |
|---|---|---|---|---|
| Moisture content of spray dried flavor powders | 3.04 | 3.02 | 3.11 | 3.64 |
| Average | | 3.03 | | 3.34 |

Average Moisture content of spray-dried powders of GLUCIDEX® 12 was comparable to that of the high soluble pea starch.

| BULK DENSITY OF SPRAY DRIED FLAVOR POWDERS | | | | |
|---|---|---|---|---|
| | GLUCIDEX ®12 Lot 1 | GLUCIDEX ® 12 Lot 2 | High soluble pea starch Batch 1 | High soluble pea starch Batch 2 |
| Bulk density of spray dried powder (g/L) | 348 | 344 | 336 | 330 |
| Average | | 346 | | 333 |

Average Bulk density of the spray dried flavor powders of GLUCIDEX®12 is slightly higher than that of the high soluble pea starch.

| COLOR OF SPRAY DRIED FLAVOR POWDERS | | | |
|---|---|---|---|
| Sample | L* | a* | b* |
| Spray dried flavor powder with GLUCIDEX ® 12 Lot 1 | 95.39 | −1.26 | 11.04 |
| Spray dried flavor powder with GLUCIDEX ®12 Lot 2 | 95.38 | −1.22 | 10.46 |
| Average | 95.39 | −1.24 | 10.75 |
| Spray dried flavor powder with high soluble pea starch Batch 1 | 92.84 | −1.15 | 11.07 |
| Spray dried flavor powder with soluble pea starch Batch 2 | 93.49 | −1.19 | 10.3 |
| Average | 93.17 | −1.17 | 10.69 |

Spray dried flavor powder of soluble pea starch showed slightly less whiteness compared to that of GLUCIDEX®® 12

| FAT CONTENT OF SPRAY DRIED FLAVOR POWDER | | | | |
|---|---|---|---|---|
| Fat content % | GLUCIDEX ®12 Lot 1 | GLUCIDEX ® 12 Lot 2 | High soluble pea starch Batch 1 | High soluble pea starch Batch 2 |
| Fat content | 4.58 | 4.77 | 5.29 | 5.58 |
| Average | | 4.68 | | 5.44 |

Results showed that the fat content of spray-dried flavor with the high soluble pea starch is slightly higher than that of GLUCIDEX® 12.

| YIELD | | | |
|---|---|---|---|
| | GLUCIDEX ®12 Lot 1 | GLUCIDEX ® 12 Lot 2 | High soluble pea starch Batch 2 |
| Percent yield | 76.13 | 73.24 | 85.10 |
| Average | 74.69 | | 85.10 |

As an average, Both GLUCIDEX® 12 and the high soluble pea starch gave more than 60% yield, which was the target for this application.

However, when running high soluble pea starch Batch 1, there were equipment issues with the spray dryer at the beginning.

The only presented yield is the yield of high soluble pea starch Batch 2. With this, it showed that soluble pea starch gave higher yield compared to GLUCIDEX® 12 in spray drying orange oil.

| ACCELERATED STORAGE STABILITY-DEVELOPMENT OF LIMONENE OXIDATION BYPRODUCTS | | | | | | | | |
|---|---|---|---|---|---|---|---|---|
| | Average Concentration µg/g powder | | | | | | | |
| | Day 0 | | Day 7 | | Day 14 | | Day 28 | |
| GLUCIDEX ® 12 | | | | | | | | |
| Compound | E211 | E351J | E211E | E351J | E211E | E351J | E211E | E351J |
| Limonene | 0 | 0 | 0 | 0 | 0 | 0 | 0 | 0 |
| cis limonene oxide | 0 | 0 | 35.85 | 41.59 | 24.35 | 20.20 | 32.86 | 71.20 |

-continued

| Trans-carveol | 0 | 0 | 269.63 | 347.35 | 383.94 | 302.97 | 350.42 | 789.65 |
|---|---|---|---|---|---|---|---|---|
| Cis-Carveol | 0 | 0 | 152.44 | 188.10 | 199.83 | 174.61 | 192.25 | 314.30 |
| Carvone0 | | 0 | 313.67 | 390.73 | 396.31 | 307.19 | 351.04 | 871.62 |
| Average Oxidation Byproducts | | | 771.58 | 967.78 | 1004.44 | 804.97 | 926.58 | 2046.77 |
| Average total Oxidation byproducts | | | 869.68 | | 904.70 | | 1486.67 | |

High Soluble Pea Starch

| Compound | Batch 1 | Batch 2 | Batch 1 | Batch 2 | Batch 1 | Batch 2 | Batch 1 | Batch 2 |
|---|---|---|---|---|---|---|---|---|
| Limonene | 0 | 0 | 0 | 0 | 0 | 0 | 0 | 0 |
| cis limonene oxide | 0 | 0 | 0 | 34.85 | 56.93 | 57.90 | 140.30 | 268.08 |
| Trans-carveol | 0 | 0 | 0 | 15.25 | 90.94 | 67.83 | 339.67 | 368.12 |
| Cis-Carveol | 0 | 0 | 0 | 10.46 | 58.68 | 31.81 | 154.77 | 167.51 |
| Carvone | 0 | 0 | 0 | 21.66 | 78.46 | 72.81 | 327.25 | 347.94 |
| Average Oxidation Byproducts | | | 0 | 82.22 | 285.02 | 230.35 | 961.99 | 1151.7 |
| Average of total Oxidation byproducts | | | 41.11 | | 257.68 | | 1056.82 | |

The tables given above show the oxidized products formed during the storage of encapsulated orange oil by either GLUCIDEX® 12 or the high soluble pea starch.

Each ingredient has two lots and data was collected for each lot stored at 0 days, 7 days, 14 days and 28 days at 45° C.

From the above tables it shows that orange oil encapsulated with either GLUCIDEX® 12 or the high soluble pea starch did not show oxidation in the first 7 days.

However, after 7 days it shows that orange oil encapsulated with GLUCIDEX® 12 oxidized at a higher rate than that of the high soluble pea starch.

At the end of 28 days. Orange oil encapsulated with GLUCIDEX® 12 created nearly twice as much of average total oxidation byproducts than that of high soluble pea starch.

Therefore, it shows that soluble pea starch provides better protection for flavor oxidation compared to GLUCIDEX® 12.

Conclusion

Based on the tests conducted, spray drying liquid preparation of the high soluble pea starch showed higher emulsion viscosities and less yellow color compared to that of GLUCIDEX® 12.

The D90 particle size (droplet size) of orange oil emulsions of the high soluble pea starch was twice as large as that of GLUCIDEX®

However, the difference was smaller in reconstituted powders.

Once spray dried, both spray dried powders of GLUCIDEX®12 and the high soluble pea starch showed comparable results for color, density and moisture contents.

The High soluble pea starch performed well in spray drying and provided a higher yield compared to GLUCIDEX® 12.

Results of the accelerated Storage stability study showed that orange oil encapsulated with GLUCIDEX® 12 oxidized at a higher rate compared to that of the high soluble pea starch and created higher amount of oxidation byproducts compared to the high soluble pea starch at the end of 28 days.

Overall, high soluble pea starch provides better protection for encapsulated flavor against oxidation compared to that of GLUCIDEX® 12.

Example 4. Evaluation of the High Soluble Pea Starch in Fat Free Vinaigrette, Compared to GLUCIDEX® 12

The objective is here is to evaluate the use of the high soluble pea starch of the invention for sauces and dressing, more particularly in the formulation of fat free Balsamic vinaigrette, to evaluate its sensory evaluation and to characterize its color and its viscosity development over time.

A comparison is done between two batches of highly soluble pea starch (Batch 3 and Batch 4) of the present invention prepared as in Example 1, and one lot of GLUCIDEX® 12.

Formulation of Fat Free Balsamic Vinaigrette

The formulas are given below.

To replace fat, solutions were made by adding 25% of either high soluble pea starch of the invention or GLUCIDEX® 12. These levels were selected after preparing several formulas to determine viscosity around 70-100 cps for a vinaigrette to give pourability but without short texture.

Higher levels of GLUCIDEX© 12 or soluble pea starch tend to give short texture, which is not desirable for a vinaigrette but desirable for salad dressing.

The inclusion level also represents the amount of maltodextrin in typical formulas to provide mouth-feel as well (5-9% solids)

| Fat free Vinaigrette | GLUCIDEX ® 12 | Soluble pea starch |
|---|---|---|
| GLUCIDEX ®12 solution (25% solids) | 30.00 | 0.00 |
| Soluble pea starch solution (25% solids) | 0.00 | 30.00 |
| Balsamic vinegar | 25.00 | 25.00 |
| Filtered Water | 21.00 | 21.00 |
| Sucrose | 11.00 | 11.00 |
| White vinegar | 8.00 | 8.00 |
| Salt | 2.32 | 2.32 |
| Garlic powder | 1.70 | 1.70 |
| Ginger powder | 0.40 | 0.40 |
| Xanthan gum | 0.20 | 0.20 |
| Citric acid | 0.18 | 0.18 |
| Red pepper flakes | 0.10 | 0.10 |
| sodium Benzoate dry | 0.10 | 0.10 |
| Total | 100.00 | 100.00 |

Method:

Preparation of 300 g soluble starch solution (25% solids):

Add 75 g of soluble pea starch and 225 g filtered water at 25° C. (room temperature) into Waring blender Mix water and soluble pea starch at speed 4 for 5 min.

Preparation of fat free vinaigrette.

Weigh all the dry ingredients and place them in a container and mix by hand until homogenous.

Weigh vinegar, water and GLUCIDEX®12 (or soluble pea starch) solution and transfer them into waring blender.

While the blender is running at speed 4, add the dry
    ingredients and continue to mix for total of 7 minutes.
Pour them into large plastic containers, close the lid and
    store until use for analysis or sensory evaluation.

Analytical Methods:

Viscosity of Vinaigrette

Method: Into RVA canister, 28 g of vinaigrette was added,
and viscosity was measured running at 25° C., 160 rpm for
8 min. Viscosity of the vinaigrette at 8 min was reported.

The measurements were obtained at time intervals of day
1, day 7 and day 30.

All the measurements were done in duplicates.

Color Measurement of Vinaigrette

Method: Color of the vinaigrettes were measured using
Hunter colorimeter. All the measurements were done in 3
replicates.

Sensory Evaluation of Vinaigrette

Method:

Triangle test was conducted using 3 coded samples of
vinaigrettes with GLUCIDEX® 12 and soluble pea starch of
the invention, in which two of the samples had the same
vinaigrette and one was different.

Panelists were asked to find the sample that was different.
For sensory evaluation, vinaigrette with soluble pea starch
Batch 4 was used.

Sample order was randomized.

Total number of panelists were 8.

Results

VISCOSITIES OF VINAIGRETTES

| Sample | day 1 (cps) | day 7 (cps) | day 30 (cps) |
|---|---|---|---|
| Batch 3 | 79.5 | 81.5 | 86.0 |
| Batch 4 | 80.0 | 82.5 | 90.0 |
| GLUCIDEX ® | 70.0 | 73.5 | 80.5 |

GLUCIDEX®12 and soluble pea starches of the inven-
tion showed slight increase in viscosity of vinaigrettes from
day 1 to day 30.

COLOR OF VINAIGRETTES

| Sample | Color | L | a | b |
|---|---|---|---|---|
| GLUCIDEX ® | Day 1 | 10.20 | 7.97 | 10.14 |
| | Day 30 | 10.29 | 7.94 | 10.33 |
| Batch 3 | Day 1 | 10.08 | 9.20 | 10.00 |
| | Day 30 | 10.11 | 9.78 | 10.41 |

-continued

COLOR OF VINAIGRETTES

| Sample | Color | L | a | b |
|---|---|---|---|---|
| Batch 4 | Day 1 | 10.10 | 9.54 | 10.43 |
| | Day 30 | 9.89 | 9.98 | 10.07 |

There is no difference among the L and b values of
vinaigrettes made with GLUCIDEX® or soluble pea
starches.

L-value was towards the lower positive end showing the
darkness of the samples.

However, a-value (redness) of GLUCIDEX® was slightly
lower than that of soluble pea starches.

After storing 30 days the colors of vinaigrettes did not
change.

Sensory Evaluation of Balsamic Vinaigrettes

Sensory Analysis-Triangle Test

Only 3 out of 8 panelists identified the different sample
correctly.

5 out of 8 panelists (62.5%) were not able to identify the
different sample out of 3 samples provided to each panelist.

This showed that the vinaigrettes were very similar in
color, texture and flavor Conclusion Viscosity analysis showed that there was no difference in
viscosity of the two vinaigrettes made with soluble pea
starch Batch 3 & Batch 4 and they were similar to the
vinaigrette made with GLUCIDEX® 12.

Over the 30 day storage at 25° C. (room temperature),
vinaigrettes with GLUCIDEX® 12 and soluble pea starches
of the invention showed slight increase in viscosity (~10
cps).

Color of the vinaigrettes were very similar and did not
change over 30 day storage at 25° C.

Sensory evaluation done by triangle test showed that the
vinaigrettes with GLUCIDEX® and Soluble pea starch were
very similar in color, texture and flavor.

Example 5. Evaluation of the High Soluble Pea Starch in Powder Beverage Formulation, Compared to GLUCIDEX® 12

The objective is here is to evaluate the use of the high
soluble pea starch of the invention for beverage, more
particularly in the formulation of tropical punch mix and
energy recovery beverage mix, to evaluate its sensory evalu-
ation and to characterize its color and its viscosity.

A comparison is done between two batches of highly
soluble pea starch (Batch 5 and Batch 6) of the present
invention prepared as in Example 1, and one lot of GLU-
CIDEX® 12.

Formulation of Tropical Mix

The formulas are given below.

| Ingredient | | |
|---|---|---|
| GLUCIDEX ® 12 | 75.41 | 0.00 |
| Soluble pea starch (Batch 5 or 6) | 0.00 | 75.41 |
| Flavor Sensient SN3000000403 Mango type FL NAT SD | 9.60 | 9.60 |
| Citric acid | 6.86 | 6.86 |
| Malic acid | 2.61 | 2.61 |
| Tartaric acid | 2.61 | 2.61 |
| Fermenich 565968 1SPM Nat Modulasense Flavor (Cream type) | 0.82 | 0.82 |
| Color Yellow 5 | 0.73 | 0.73 |
| Asulfame potassium | 0.69 | 0.69 |
| Sucralose | | 0.69 | 0.69 |
| Total | 100 | 100 |

Method: 100 g powder mix
Weigh all the ingredients and mix well in a shaker for 10
min.
Preparation of Punch Drink
Add 8 g of powder mix to 8 oz (240 g) filtered water.
Scale up as needed.
Shake well to dissolve.
Pour them into large plastic containers, close the lid and
store until use for analysis or sensory evaluation.
Formulation of Energy Beverage Mix
The formulas are given below.

| Ingredient | Formula with GLUCIDEX ® 12 | Formula with soluble pea starch |
|---|---|---|
| NUTRALYS ® S plus N from ROQUETTE FRERES | 42.85 | 42.85 |
| GLUCIDEX ® 12 | 36.67 | 0.00 |
| Soluble pea starch (Batch 5 or 6) | 0.00 | 36.67 |
| Premix 5420 fat powder | 8.33 | 8.33 |
| NUTRIOSE ® FM 06 form ROQUETTE FRERES | 2.43 | 2.43 |
| Fermenich 565968 1SPM Nat Modulasense Flavor (Cream type) | 0.83 | 0.83 |
| Fermenich Nat bitterness Blocker 566020 SPM | 0.25 | 0.25 |
| Xantham gum | 0.17 | 0.17 |
| Asulfme potassium | 0.07 | 0.07 |
| Sucralose | 0.07 | 0.07 |
| Total | 100 | 100 |

Method: 100 g powder mix

Weigh all the ingredients and mix well in a shaker for 10
min.

Preparation of Energy Drink

Add 60 g of powder mix to 8 oz (240 g) filtered water.
Scale up as needed.

Shake well to dissolve.

Pour them into large plastic containers, close the lid and
store until use for analysis or sensory evaluation.

Analytical Methods:

Viscosity of Tropical Punch Beverages and Energy Beverages

Methods:

Punch beverage: Into RVA canister, 28 g of prepared
beverage were added and viscosity was measured running at
5° C., 160 rpm for 8 min.

Viscosity of the beverage at 8 min was reported.

The measurements were obtained at time intervals of day
0 and day 15.

Energy beverage: Into RVA canister, 28 g of prepared
beverage were added and viscosity was measured running at
5° C., 160 rpm for 8 min. Viscosity of the beverage at 8 min
was reported at day 0 only.

All the measurements were done in duplicates.

Color Measurement of Tropical Punch Beverage'

Method: Color of the prepared beverages with water were
measured using Hunter colorimeter. All the measurements
were done in 3 replicates.

Light Absorbance (Turbidity) of Tropical Punch Beverages

Method: Absorbance (turbidity) was measured at 700 nm
(visible wavelength) with Shimadzu spectrophotometer.

Prepared beverages with water were measured using a
spectrophotometer.

Measurements were taken at day 0 and after 15 days
stored in the refrigerator (4° C.).

Sensory Evaluation of Tropical Punch Beverage and Energy
Recovery Beverage

Method:

Punch beverage: Triangle test was conducted using 3
coded samples of prepared punch beverage with GLUCI-
DEX® 12 and Soluble pea starch from the invention, in
which two of the samples had the same beverage and one
was different. Panelists were asked to find the sample that
was different.

For sensory evaluation, beverages made with Batch 6 was
used.

Sample order was randomized. Total number of panelists
were 12

Energy recovery beverage: the same procedure was done
with energy recovery beverage mixes made with Batch 6 or
GLUCIDEX® 12 after adding water.

Results

| VISCOSITY OF TROPICAL PUNCH MIX | | |
|---|---|---|
| Viscosity | Day 0 (cps) | Day 15 (cps) |
| GLUCIDEX ® 12 | 16.5 | 18.5 |
| Soluble pea starch Batch 5 | 16.5 | 18.5 |
| Soluble pea starch Batch 6 | 16.5 | 18.0 |

As soon as the punch beverages were made (day 0) the
viscosities of both Punch beverages with GLUCIDEX® 12
and Soluble pea starch were similar.

Even though the beverages are instant beverages, the
reconstituted beverages were stored at 4° C. for 15 days and
viscosities were measured again.

Both punch beverages with GLUCIDEX® 12 and soluble
pea starch showed slight increase in viscosity from day 0 to
day 15.

The soluble pea starches from the invention are quite
similar to maltodextrins.

| VISCOSITIES OF ENERGY BEVERAGE | |
| --- | --- |
| Viscosity | Day 0 (cps) |
| GLUCIDEX ® 12 | 93.7 |
| Soluble pea starch Batch 5 | 92.0 |
| Soluble pea starch Batch 6 | 93.0 |

Energy beverages with soluble pea starch from the invention and GLUCIDEX® 12 showed similar viscosities.

| COLOR OF TROPICAL PUNCH BEVERAGES | | | | |
| --- | --- | --- | --- | --- |
| Sample | Color | L | a | b |
| GLUCIDEX ®12 | Day 0 | 16.33 | −1.01 | 28.09 |
| | Day 15 | 18.13 | −0.65 | 28.80 |
| Soluble pea starch | Day 0 | 20.03 | −1.62 | 33.70 |
| Batch 5 | Day 15 | 25.66 | −1.47 | 40.43 |
| Soluble pea starch | Day 0 | 20.53 | −1.43 | 34.50 |
| Batch 6 | Day 15 | 25.58 | −1.37 | 40.38 |
| Average of soluble | Day 0 | 20.28 | −1.53 | 34.10 |
| pea starch | Day 15 | 25.62 | −1.42 | 40.41 |

On day 0—L, a, b-values of punch beverage with GLUCIDEX® 12 are lower than that of soluble pea starch punch beverage.

However, visually it was difficult to identify. Upon storing the punch beverages for 15 days, more cloudiness developed in punch beverage with soluble pea starch compared to the beverage with GLUCIDEX® 12. This was mainly shown by the higher increase of L-values of punch beverages with soluble pea starch.

| LIGHT ABSORBANCE (TURBIDITY) OF TROPICAL PUNCH BEVERAGES | | | |
| --- | --- | --- | --- |
| Sample | Day | Dilution | Abs |
| Soluble pea starch | 0 | 1 | 0.644 |
| | 15 | 1 | 1.156 |
| GLUCIDEX ® 12 | 0 | 1 | 0.354 |
| | 15 | 1 | 0.467 |

Beverages with Soluble pea starch showed higher absorbance (higher turbidity) at day 0 compared to that of GLUCIDEX® 12.

However, after 15 days the absorbance (turbidity) of beverages with soluble pea starch increased significantly compared to the beverages with GLUCIDEX 12. This showed that soluble pea starch develops turbidity upon storage and may be used as a natural opacifying agent for Ready to Drink (RTD) beverages.

Sensory Evaluation of Energy Beverage

Sensory Analysis-Triangle Test

Only 4 out of 12 panelists identified the different sample correctly. This is the total of panelists who were able to identify the different samples correctly by with guessing (2 panelists) or without guessing (2 panelists).

This showed that the energy beverages made with GLUCIDEX® 12 and soluble pea starch from the invention were similar in terms of appearance, flavor, color and mouthfeel. The panelists who identified the different sample correctly mentioned that the beverage with soluble peas starch is slightly more viscous and foamy compared to the beverage with GLUCIDEX® 12.

The number of panelists needed to be significantly different is 8 out of 12.

CONCLUSION

Viscosity analysis showed that there was no difference in viscosity of the punch beverages or energy beverages made with soluble pea starch batch 5 and 6 and GLUCIDEX® 12. Over the 15 days storage at 4° C., punch beverages made with GLUCIDEX® 12 and soluble pea starch showed slight increase in viscosity (~2 cps).

However, punch beverage with soluble pea starch showed more opacity development compared to the beverage with GLUCIDEX® 12.

Sensory evaluation done by triangle test showed that punch beverages and energy beverages with GLUCIDEX® 12 and soluble pea starch were very similar in color, texture and flavor.

The invention claimed is:

1. A highly soluble leguminous starch having:
   a content of oligosaccharides with a Degree of Polymerization (DP) of 1 and 2 of less than 10% in weight,
   a content of oligosaccharides with a DP of 3 to 20 of more than 50% in weight,
   a water solubility of more than 90% in weight,
   a viscosity of less than 500 cP,
   wherein:
   an α 1,4/α 1,6 ratio determined by $^{13}$C NMR between 25 to 35%.

2. The highly soluble starch according to claim 1, wherein the starch is pea or faba bean starch.

3. A method of preparation of a highly soluble leguminous starch according to claim 1, said method comprising the steps of:
   preparation of a starch-water mixture containing starch,
   gelatinization of the starch-water mixture to obtain a gelatinized starch,
   cooking of the gelatinized starch to obtain a cooked solution,
   optionally, homogenization of the cooked solution to obtain a homogenized cooked solution, and
   sonication of the optionally homogenized cooked solution to obtain a sonicated solution,
   optionally, refining of the sonicated solution, evaporation to concentrate the sonicated solution to obtain a concentrated solution, and
   drying of the concentrated solution to obtain a powder product.

4. The method according to claim 3, wherein the starch is a native leguminous starch.

5. The method according to claim 4, wherein the starch is pea or faba bean starch.

6. The method according to claim 3, wherein the starch in the initial starch-water mixture represents 5 to 20% by weight with respect to the total weight of the starch-water mixture.

7. The method according to claim 3, wherein the gelatinization is performed by steam cooking, jet-cooker cooking, cooking on a drum, cooking in kneader/extruder systems followed by drying in an oven, by hot air on a fluidized bed, on rotating drum, by atomization, by extrusion or by lyophilization.

8. The method according to claim 3, wherein the gelatinization of the starch is performed at a temperature between 50 to 90° C., for 1 to 60 minutes.

9. The method according to claim 3, wherein the starch is pea starch and the gelatinization of the starch is performed at a temperature between 72 to 75° C., for 10 to 15 minutes.

10. The method according to claim 3, wherein the cooking of the gelatinized starch is performed at a temperature between 100 to 200° C., at a pressure between 1.43 to 12.55 bar.

11. The method according to claim 3, wherein the starch is pea starch and the cooking of the gelatinized pea starch is performed at a temperature between 145 to 175° C. at a pressure between 4.16 to 8.94 bar.

12. The method according to claim 3, wherein the cooked starch is optionally passed through a shearing device at a pressure between 500 to 1000 bar with back pressure between 50 to 100 bar, at a temperature between 15 to 95° C.

13. The method according to claim 3, wherein the starch is pea starch and the cooked starch is optionally passed through a shearing device at a pressure between 700 to 800 bar with back pressure between 70 to 80 bar, at a temperature between 45 to 55° C.

14. The method according to claim 3, wherein the cooked solution is sonicated at a frequency between 10 to 360 kHz, at a temperature between 30 to 80° C.

15. The method according to claim 3, wherein the starch is pea starch and the cooked pea starch solution is sonicated at a frequency of 15 to 25 kHz, at a temperature between 40 to 45° C.

16. The method according to claim 3, wherein the sonicated solution is optionally evaporated as syrup or dried into powder form using a dryer.

17. The method according to claim 16, wherein the sonicated solution is dried into powder form using a spray dryer, the inlet temperature in the spray dryer being between 150 to 250° C., and the outlet temperature being between 60 to 120° C.

18. A method of formulating a food composition having reduced or no maltodextrin, comprising the step of incorporating the highly soluble leguminous starch of claim 1 into the formulation of the food composition having reduced or no maltodextrin to partially or totally replace maltodextrin in the formulation.

19. The method of claim 18, wherein the food composition is selected from a bakery composition, a sauce or dressing composition, and a dairy or beverage composition.

20. The method of claim 18, wherein the highly soluble leguminous starch is incorporated into the formulation of the composition to partially or totally replace the maltodextrin required as carrier for flavor encapsulation.

21. The method of claim 18, wherein the food composition is a fat free vinaigrette or a powder beverage.

\* \* \* \* \*